United States Patent [19]
Chronister

[11] Patent Number: 5,170,819
[45] Date of Patent: Dec. 15, 1992

[54] VALVE SYSTEM FOR MOBILE TANK CARS

[76] Inventor: Clyde H. Chronister, 6115 Bermude Dunes, Houston, Tex. 77069

[21] Appl. No.: 873,959

[22] Filed: Apr. 27, 1992

[51] Int. Cl.⁵ ............................................. E03B 11/00
[52] U.S. Cl. .................................... 137/590; 137/347; 137/613; 251/144; 105/358
[58] Field of Search ................... 251/144, 89; 137/590, 137/347, 350, 613, 382, 797; 105/358

[56] References Cited

U.S. PATENT DOCUMENTS

| | | | |
|---|---|---|---|
| 1,443,231 | 1/1923 | McCauley | 137/590 |
| 1,683,021 | 9/1928 | Brown | 137/590 |
| 1,894,655 | 1/1933 | Auchincloss | 137/590 |
| 2,102,124 | 12/1937 | Lithgow | 105/358 |
| 2,917,068 | 12/1959 | Davis | 137/590 |
| 4,114,783 | 9/1978 | Wempe et al. | 137/590 |
| 4,248,261 | 2/1981 | Carlson | 137/590 |
| 4,347,863 | 9/1982 | Keyes | 105/358 |
| 4,512,360 | 4/1985 | Chronister | 137/326 |
| 4,542,764 | 9/1985 | Brittingham et al. | 137/347 |
| 5,042,776 | 8/1991 | Chronister | 251/144 |

*Primary Examiner*—A. Michael Chambers
*Attorney, Agent, or Firm*—Fulbright & Jaworski

[57] ABSTRACT

A protective valve system including a pipe extending into the tank through a wall with a seat positioned in the pipe inside of the tank and a safety plug movable for releasable and sealingly seating on the seat. A first valve is positioned outside the tank and connected to the pipe and a second valve is positioned in the pipe inside of the tank. A valve operator positioned inside of the tank is connected to the second valve but is exposed to the exterior of the tank for actuation.

6 Claims, 1 Drawing Sheet

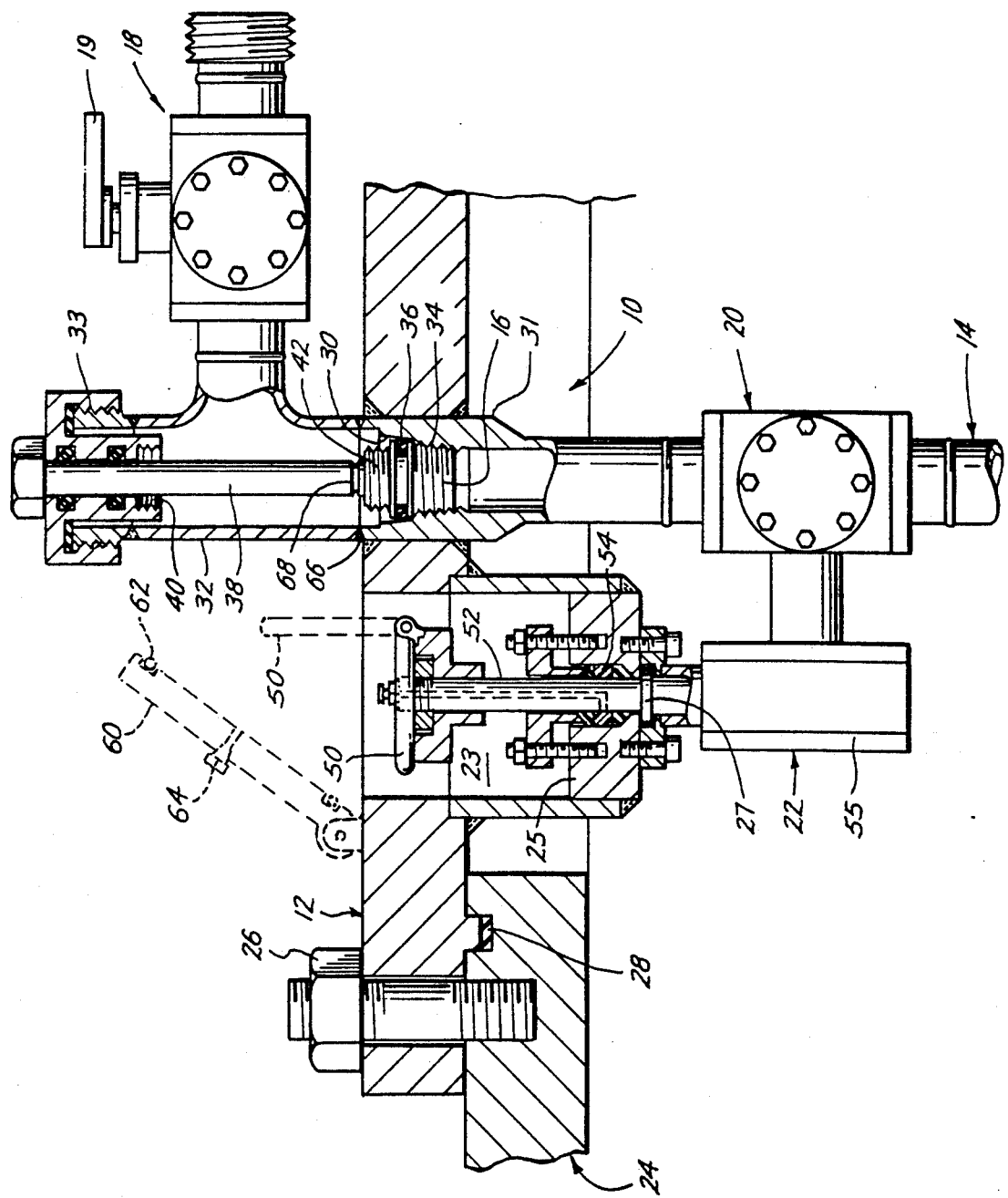

VALVE SYSTEM FOR MOBILE TANK CARS

BACKGROUND OF THE INVENTION

The present invention is directed to a protective valve system for mobile tank cars that can be used for loading or unloading tanks, for example, railroad tank cars and truck tanks.

It is known in my earlier U.S. Pat. No. 5,042,776 to provide a mobile tank with a tank valve and operator, both of which are positioned internally of the tank, and are therefore less subject to being damaged particularly if the tank is subject to an accident.

The present invention is directed to a protective valve system for a mobile tank and particularly is useful for top loading and unloading of a tank, provides multiple protective seals, is able to overcome vibrations and shock without opening, and can be conveniently installed and repaired.

SUMMARY

The present invention is directed to a valve system for mobile tank cars and includes a pipe extending into the tank through a wall of the tank, and a seat positioned in the pipe and positioned inside the tank. A safety plug housing is connected to the pipe and is positioned outside of the tank. A safety plug is movably positioned in the housing between a position sealably seated on the seat thereby blocking fluid passageway through the pipe and a retracted position allowing fluid flow through the seat. A first valve is positioned outside of the tank and connected to the housing for filling and emptying the tank. A second valve is positioned in the pipe for opening and closing the pipe and the second valve is positioned inside the tank. A valve operator is positioned inside the tank and connected to the second valve, but exposed to the exterior of the tank for actuation and includes means for rotating the second valve.

Still a further object of the present invention is wherein the safety plug is releasably secured to the seat.

Still a further object is the provision of means sealingly extending through the pipe to the exterior of the tank for releasing and securing the plug to the seat.

A still further object of the present invention is the provision of means releasably holding the plug off of the seat.

Yet a further object of the present invention is the provision of shear sections in all items extending through the exterior of the tank.

Yet a still further object of the present invention is the provision of a valve system for the top of mobile tank cars having a top opening. The system includes a valve flange releasably connected to the top of the tank covering the opening. A pipe is sealingly secured to the flange and extends from adjacent the tank bottom to the exterior of the tank top. A seat is positioned in the pipe and positioned inside the tank. A safety plug housing, such as a tee, is connected to the pipe and positioned outside of the tank. A safety plug is movably positioned in the housing between a position sealably seated on the seat blocking fluid passageway through the pipe and a retracted position allowing fluid flow through the seat. The safety plug is releasably secured to the seat. Plug actuating means sealably extend through the pipe housing to the exterior of the tank for releasing and securing the plug to the seat. A first valve is positioned outside the tank and is connected to the housing above the seat for filling and emptying the tank. A second valve is positioned in the pipe and in the tank below the seat for opening and closing the pipe. A valve operator positioned inside of the tank is connected to and actuates the second valve.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

The drawing is an elevational view, partly in cross section, of the present invention in use in a tank.

DESCRIPTION OF THE PREFERRED EMBODIMENT

Referring now to the drawing, the reference numeral 10 generally indicates the protective valve system of the present invention which generally includes a flange 12, a pipe 14, a safety plug 16, a first valve 18, a second valve 20, and a valve operator 22. The valve system 10 is adapted to be installed in a tank 24, for example, in the top of a railroad tank car, and protect the contents thereof in the case of an accident. The system 10 can quickly and easily be installed, and quickly and easily be removed and repaired.

The entire system 10 can be fabricated and assembled and installed in a tank. The flange 12 carries the system and is mated to the tank top flange 24 after lowering the pipe 14 into the tank 24 where it conventionally extends from the tank bottom to externally of the tank through the flange 12. The flange 12 is secured to the tank flange 24 by suitable studs or nuts 26 in a sealing relationship by a gasket 28. The pipe 14 extends through the flange 12 by a welded connection to eliminate possible flange leaks. A seat 30 is positioned in the pipe 14 and positioned inside the exterior of the flange 12 and thus is enclosed inside tank 24. Preferably, the wall 31 of the pipe 14 about the seat 30 is enlarged and strengthened for safety purposes.

A safety plug housing 32, such a tee, is connected to and in communication with the upper end of the pipe 14 and is positioned outside of the tank. A safety plug 16 is movably positioned in the housing 32 between a position sealingly seated on the seat 30 blocking fluid passageway through the pipe 14 and a retracted position up in the housing 32 allowing fluid flow through the seat 30 and pipe 14. The safety plug 16 is releasably secured in the seat 30, such as by a coacting threaded connection 34, and is sealed to the seat 30 by a suitable seal, such as an O-ring 36. Plug actuating means, such as plug shaft 38, slidably and sealingly extends through the exterior of the housing 32 for actuating and controlling the position of the safety plug 16. In addition, releasable connecting means are provided between the plug 16 and the housing 32 for holding the plug 36 off of the seat 30 while the tank is being filled or emptied. Thus, threads 40 connected to the housing 32 coact with threads 42 on the plug 16 for releasably holding the plug 16 in a retracted position. The housing 32 has an end cap 33 which is threadably and sealably connected to the housing 32 for insertion of and removal of the plug 16 for inspection and/or repair.

A first loading and unloading valve 18 is positioned outside of the flange 12 and connected to the tee housing 32 above the seat 30 for filling and emptying the tank. The valve 18 may be suitably actuated such as by a valve operator handle 19.

A second valve 20 is positioned in the pipe 14 below the seat 30 for opening and closing access to the tank through the pipe 14. While the valves 18 and 20 may be of any suitable type, it is preferably that they are of a ball valve type, such as disclosed in U.S. Pat. No. 4,512,360, which has the advantages of double seals and ease of repair.

The valve operator 22 is positioned inside the flange 12 and is connected to the second valve 20, but exposed to the exterior of the tank through the flange 12 for actuation and includes means for rotating the second valve 20. Thus, the operator 22 includes a flip-up handle 50 connected to an actuating shaft 52 which passes through seal packing 54 and preferably actuates a conventional gear box 55 which in turn actuates the valve 20. While, of course, the valve operator 22 could be a direct hand wheel or lever, the addition of the gear box 55 insures that the valve 20 will be less subject to vibrations and unexpected shocks which might cause the valve 20 to leak. The operator 22 includes a recessed operator housing 23 for receiving and protecting the handle 50 and stem 52 in the case of an accident. The housing 23 is welded to flange 12 and positioned inside the tank 24. An adapter 25 may be secured to the housing 23 and hold a safety flange 27 for preventing the stem 52 from being blown out.

The valve operator 22 can be moved by lifting the flip-up handle 50 to the dotted position where it becomes a speed hand wheel to allow faster actuation of the valve 20.

If desired, a locking cover 60 may be provided which locks in a down position covering the valve operator 22 and includes a sealing gasket 62 in a downward closed position (not shown) whereby the gasket 62 contains any possible leakage. A plug vent 64 is shown on the locking cover 60 which can be backed off before opening the cover 60 to determine if any product has leaked inside of the valve operator 22.

It is to be noted that the housing 32 includes a weld shear line 66 and the shaft 38 includes a shear groove 68. In the event that there is an accident and the tank skids or rolls over, the valve system 10 of the present invention will prevent leakage of the product in the tank. That is, the housing 32 will shear at point 66 and the shaft 38 will shear at the groove 68, and while the protection of the first valve 18 will be lost, the safety plug 16 and the second valve 20 will remain in place enclosed in and protected beneath the flange 12 to prevent leakage of the tank product. In normal use, the entire valve system 10 can be installed and removed by installing and removing the flange 12 which allows ease of repair. Furthermore, in normal operation, there are always a plurality of sealing devices in place for preventing the escape of materials from the tank. For example, with the cover 60 closed, there are at least two different sealing arrangements to prevent escape of fluids through the flange 12 and in the case of the pipe 14 there are three different sealing systems to provide redundant protection.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art and which are encompassed within the spirit of the invention and the scope of the appended claims.

What is claimed is:

1. A valve system for mobile tank cars comprising,
    a pipe extending into the tank through a wall of the tank,
    a seat positioned in the pipe and positioned inside the tank,
    a safety plug housing connected to the pipe and positioned outside of the tank,
    a safety plug movably positioned in the housing between a position sealably seated on the seat blocking fluid passageway through the pipe and a retracted position allowing fluid flow through the seat,
    a first valve positioned outside the tank and connected to the housing for filling and emptying the tank,
    a second valve positioned in the pipe for opening and closing said pipe, said second valve positioned in the tank,
    a valve operator positioned inside the tank and connected to the second valve, but exposed to the exterior of the tank for actuation, and including means for rotating the second valve.
2. The valve system of claim 1 wherein said safety plug is releasably secured to the seat.
3. The valve system of claim 2 including,
    means sealingly extending through the pipe to the exterior of the tank for releasing and securing the plug to the seat.
4. The valve system of claim 2 including,
    shear sections in all items extending through the exterior of the tank.
5. The valve system of claim 3 including,
    means releasably holding the plug off of the seat.
6. A valve system for the top of mobile tank cars having a top opening comprising,
    a valve system flange releasably connected to the top of the tank covering the opening,
    a pipe sealingly secured to the flange and extending from adjacent the tank bottom to the exterior of the tank top,
    a seat positioned in the pipe and positioned inside the tank,
    a safety plug tee housing connected to the pipe and positioned outside of the tank,
    a safety plug movably positioned in the housing between a position sealably seated on the seat blocking fluid passage through the pipe and a retracted position allowing fluid flow through the seat, said safety plug being releasably secured to the seat,
    plug actuating means sealingly extending through the pipe housing to the exterior of the tank for releasing and securing the plug to the seat,
    a first valve positioned outside the tank and connected to the tee housing above the seat for filling and emptying the tank,
    a second valve positioned in the pipe and in the tank below the seat for opening and closing the pipe,
    a valve operator positioned inside the top of the tank and connected to the second valve, but exposed to the exterior of the tank through the flange for actuation and including means for rotating the second valve.

* * * * *